United States Patent
Kenchammana-Hosekote et al.

(10) Patent No.: US 7,159,150 B2
(45) Date of Patent: Jan. 2, 2007

(54) DISTRIBUTED STORAGE SYSTEM CAPABLE OF RESTORING DATA IN CASE OF A STORAGE FAILURE

(75) Inventors: Deepak R. Kenchammana-Hosekote, San Jose, CA (US); James L. Hafner, San Jose, CA (US); Marc T. Roskow, Los Gatos, CA (US); Omer A. Zaki, San Jose, CA (US); Dulce B. Ponceleon, Palo Alto, CA (US); Richard F. Freitas, San Martin, CA (US); Garth R. Goodson, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 10/335,284

(22) Filed: Dec. 31, 2002

(65) Prior Publication Data

US 2004/0128587 A1   Jul. 1, 2004

(51) Int. Cl.
*G06F 11/00* (2006.01)
(52) U.S. Cl. ............ 714/43; 714/4; 714/6; 714/9
(58) Field of Classification Search ............ 714/4, 714/6, 9
See application file for complete search history.

(56) References Cited

U.S. PATENT DOCUMENTS

| | | | | |
|---|---|---|---|---|
| 5,566,316 A | * | 10/1996 | Fechner et al. | 711/114 |
| 5,815,649 A | * | 9/1998 | Utter et al. | 714/6 |
| 6,438,661 B1 | | 8/2002 | Beardsley et al. | |
| 6,675,316 B1 | * | 1/2004 | Harper | 714/4 |
| 2002/0062422 A1 | | 5/2002 | Butterworth et al. | |
| 2002/0138695 A1 | | 9/2002 | Beardsley et al. | |
| 2004/0010568 A1 | * | 1/2004 | Goodman et al. | 709/220 |
| 2004/0153479 A1 | * | 8/2004 | Mikesell et al. | 707/200 |
| 2005/0022045 A1 | * | 1/2005 | Fenart et al. | 714/4 |

OTHER PUBLICATIONS

Fault-Tolerant Replication Management in Large-Scale Distributed Storage Systems—Richard Golding et al., (SRDS 99). Lausanne, Switzerland, Oct. 19-22, 1999.

(Continued)

*Primary Examiner*—Robert Beausoliel
*Assistant Examiner*—Charles Ehne
(74) *Attorney, Agent, or Firm*—Michael J. Buchenhorner; Edmund Mizumoto (57) ABSTRACT

A collective storage system and method for restoring data in the system after a failure in the system. The system includes multiple storage nodes that are interconnected by a network and store data as extents. There are also a set of Data Service (DS) agents for managing the extents, a set of Metadata Service (MDS) agents for managing metadata relating to the nodes and the extents, and a Cluster Manager (CM) agent in each node. After a node failure is detected by one of the CM agents, the agents responsible for coordinating the data restoring are notified of the failure. The agents generate a plan to restore the data extents affected by the failure, and then collectively restoring the affected extents based on the generated plan. The coordinating agents might be the MDS agents or DS agents. The failure might be a node failure or a disk failure.

36 Claims, 8 Drawing Sheets

OTHER PUBLICATIONS

The Tickertaip Parallel Raid Architecture, Pei Cao et al., Hewlett-Packard Laboratories, Aug. 1994, http:/portal.acm.org.

Serverless Network File Systems, Thomas E. Anderson, et al. UCB, Feb. 1996, vol. 14 Issue 1.

Improved Disk Drive Failure Warnings, G.F. Hughes et al., IEE Transactions on Reliability, Sep. 2002.

Petal: Distributed Virtual Disks, Edward K. Lee et al., Digital Equipment Coproration.

* cited by examiner

Fragment-to-Disk Map

| Extent ID | Fragment ID | Disk ID and Address |
|---|---|---|
| ABC0052 | 0001 | 01 - 2001 |
| ABC0060 | 0003 | 09 - 3002 |
| | | |

*FIG. 5*

Extent-to-Node Map

| Extent ID | Node for Fragment 1 | Node for Fragment 2 | Node for Fragment 3 |
|---|---|---|---|
| ABC0052 | Node 1 | Node 2 | Node 3 |
| | | | |

DISTRIBUTED STORAGE SYSTEM CAPABLE OF RESTORING DATA IN CASE OF A STORAGE FAILURE

TECHNICAL FIELD

This invention relates generally to computer storage systems, and more particularly to a distributed storage system and method for restoring data after the failure of a data storage node in the system or of a disk in one of the nodes.

BACKGROUND OF THE INVENTION

Large amount of computer data is typically held in a distributed storage system. Distributed storage systems offer several advantages: the ability to add more storage capacity as user requirements increase, the reliability of data based on data redundancy, and the flexibility in servicing and replacing failed components. Distributed storage systems have been implemented in various forms such as Redundant Arrays of Independent Disks (RAID) systems. RAID systems are described, for example, in the paper entitled "A Case for Redundant Arrays of Inexpensive Disks (RAID)" by Patterson et al.

In the paper entitled "The TickerTAIP Parallel RAID Architecture," Cao et al. describe a disk array (RAID) system that includes a number of worker nodes and original nodes. Each worker node has several disks connected through a bus. The original nodes provide connections to the computer clients. When a disk or a node fails, the system reconstructs lost data by using the partial redundancy provided in the system. The described method is specific to using only RAID storage systems. Furthermore, the method does not address the problem of a distributed storage system composed of a very large number of independent storage arrays. It further assumes that the communication interconnect is reliable and therefore does not deal with the wide range of problems arising from this unreliable interconnect.

U.S. Pat. No. 6,438,661 describes a method and system for restoring lost metadata in a cache memory. The metadata provides information on user data maintained in a storage device. The method determines whether metadata tracks in the cache were modified, indicates in a non-volatile memory that the metadata tracks were modified, and restores the metadata tracks. The data restoring includes accessing the data tracks associated with the metadata tracks, staging the accessed data tracks into cache, and processing the data tracks to restore the metadata tracks. The described method does not restore data that is lost due to a failed node in a distributed storage system.

U.S. Patent Application 20020062422 describes another method for restoring metadata in a storage system in which data flows are written into the system as segments. The method scans the metadata in each segment to identify the last segment written from each flow. It then restores the metadata using the metadata in the segments excluding the metadata for the identified last segments. The described method is not applicable to a distributed multi-node storage system and does not address the problem of restoring data after a node fails.

In the paper entitled "Petal: Distributed virtual disks", Lee et al describe a distributed storage system composed of a collection of virtual disks. The described method keeps a copy of metadata on every node. This becomes a problem as all nodes need to be updated and involved for any change in metadata. Furthermore, it has limited runtime adaptation during failures.

In the paper entitled "Serverless Network File Systems", Anderson et al. describe a serverless distributed file system. The described method is specifically for file systems. In addition, it requires active participation of clients for its correctness and data restoration, thereby relying on clients and requiring commitments from them.

Therefore, there remains a need for a distributed storage system and method for restoring data affected by the failure of a storage node in the system or of a disk in a storage node without the drawbacks described above.

SUMMARY OF THE INVENTION

It is an object of the present invention to provide a collective storage system and method for restoring data affected by the failure of a storage node or a disk in the system.

It is another object of the invention to provide agents in the system nodes for detecting node and disk failures and collectively restoring the affected data.

It is still another object of the invention to provide a method for restoring the affected data based on a restore plan generated by the agents in the system.

It is a further object of the invention to provide a method for restoring the affected data in which the restoring task is coordinated by a Data Service (DS) agent or a Metadata Service (MDS) agent.

To achieve these and other objects, the present invention provides a collective data storage system that includes multiple storage nodes connected by a network. Each node stores data as extents and has a data service (DS) agent for managing the extents in the node. Some of the nodes have metadata service (MDS) agents for managing metadata relating to the nodes and data extents in the system. A cluster manager (CM) agent in each node detects a failure in the system and notifies a coordinator agent of the failure. The coordinator agent generates a plan to restore the extents affected by the failure. The agents in the system collectively restore the affected extents based on the generated plan.

In one preferred embodiment of the invention, the coordinator agent is a DS agent. In another preferred embodiment of the invention, the coordinator agent is an MDS agent. The generation of a restore plan includes identifying those extents affected by the failure and allocating new space in the nodes to rebuild the affected extents. In the case of a node failure, the affected extents are identified based on an Extent_To_Node map. The node failure is preferably detected using a heart-beat monitoring technique. In the case of a disk failure, the affected extents are identified using a Fragment_To_Disk map. The disk failure is preferably detected based on the error rates of the disks on the storage nodes.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention will be described primarily as a collective storage system and method for restoring data loss caused by the failure of a storage node in the system or by the failure of a disk in a storage node. However, persons skilled in the art will recognize that an apparatus, such as a data processing system, including a CPU, memory, I/O, program storage, a connecting bus, and other appropriate components, could be programmed or otherwise designed to facilitate the practice of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
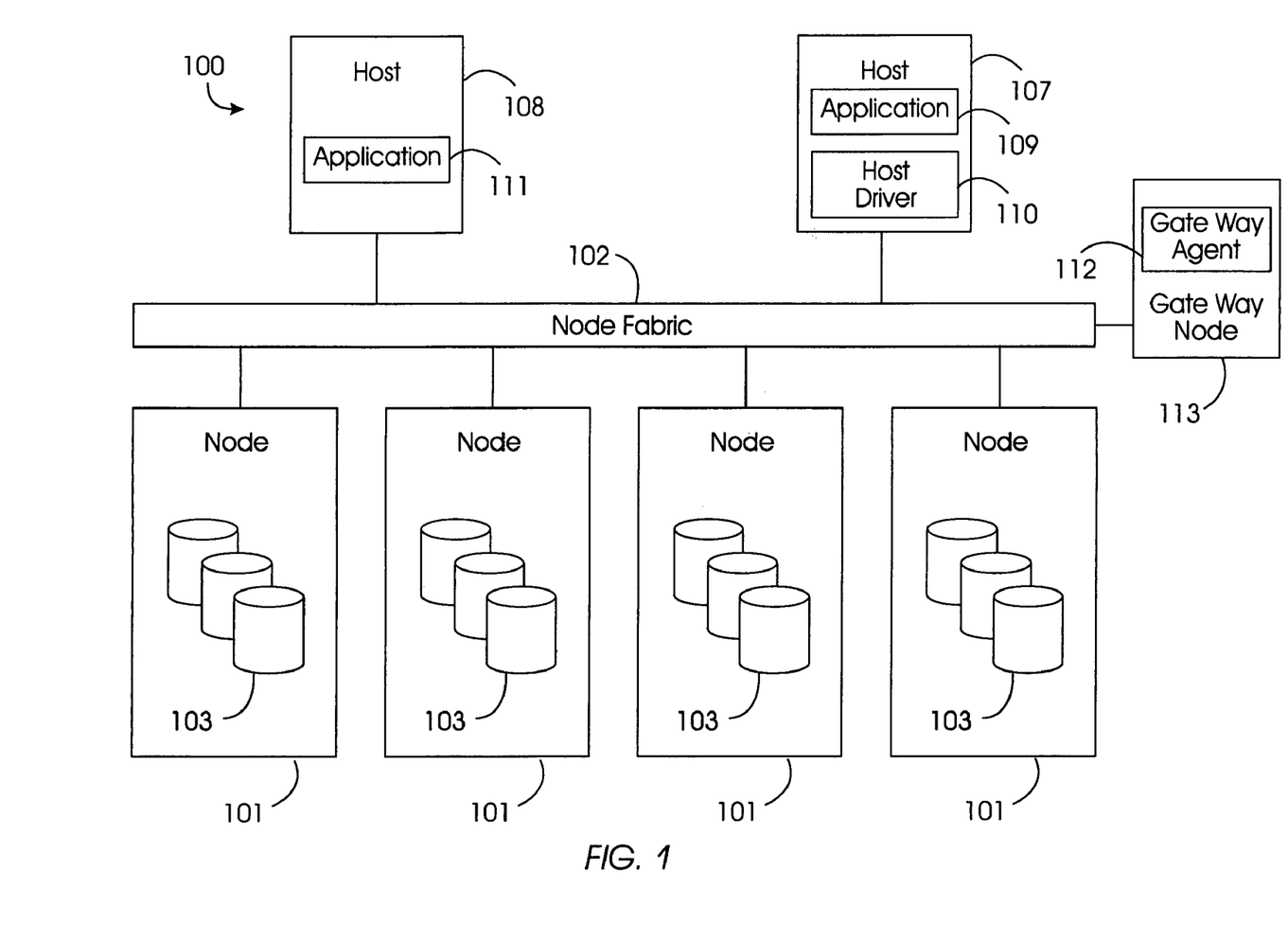
FIG. 1 is a block diagram showing a typical configuration of the collective storage system of the invention.

FIG. 1 is a high-level block diagram of a collective storage system 100 of the invention. The system 100 includes a large number of storage nodes 101 that are commonly connected to a node fabric 102. Each node 101 includes one or more privately attached disks 103 that contain customer data. The node fabric 102 is preferably a Fiber Channel network, an iSCSI network, or another type of network. More details of the storage nodes 101 are described below in reference to FIGS. 2–6.

Clients of the customer data maintained by the collective storage system 100 are referred to as hosts. The hosts might be connected to the storage system 100 using two types of interfaces: a host driver or a gateway. FIG. 1 depicts two hosts 107 and 108. In the case of host 107, its application 109 accesses data in the storage nodes 101 using a host driver 110. In the case of host 108, its application 111 accesses the customer data using a gateway agent 112 that resides in a gateway node 113. More details on the functions of the host driver 110 and gateway agent 112 are described below with other agents in the system 100. Typically, the applications 109 and 111 are file systems or database systems.

Figure 2:
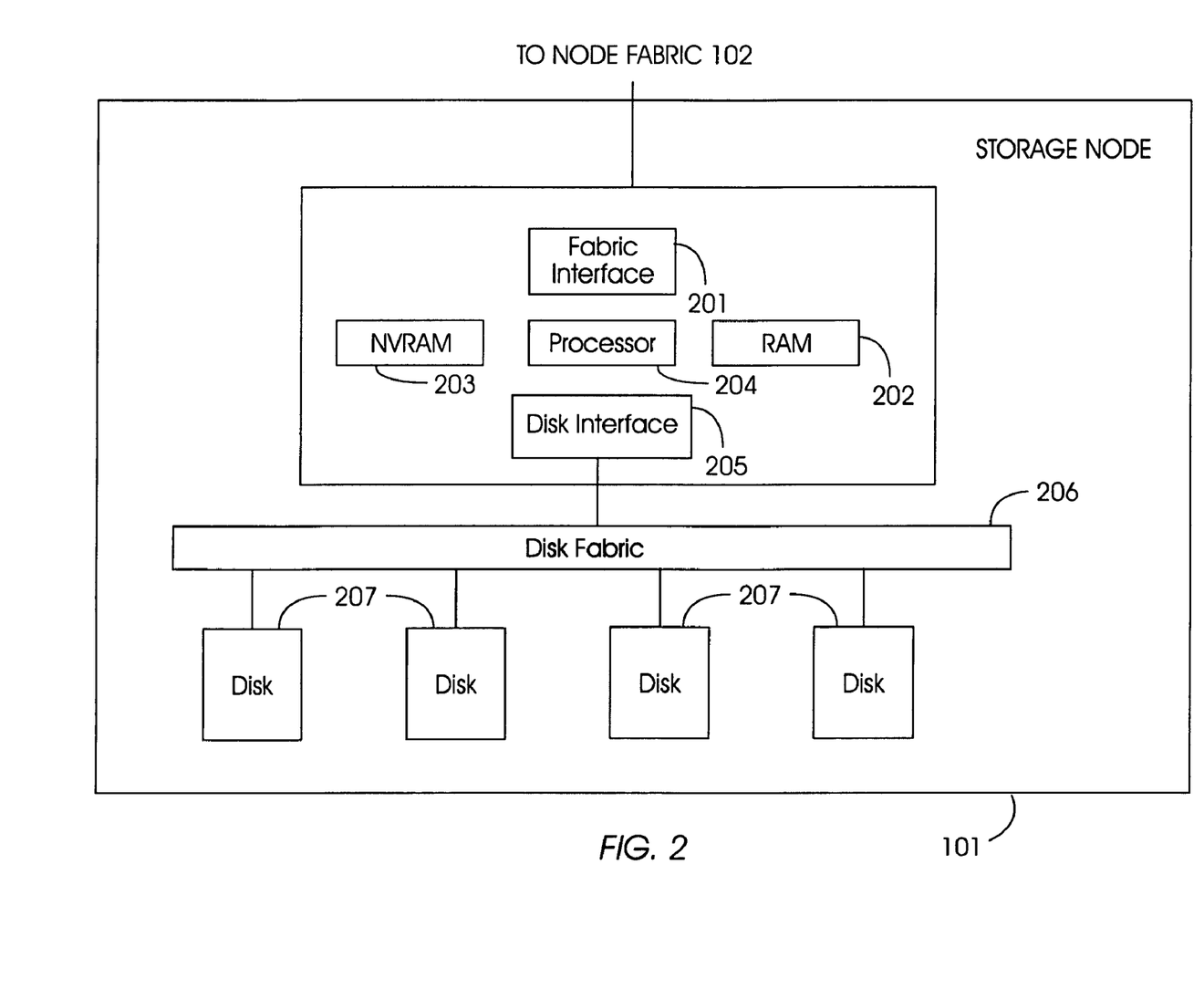
FIG. 2 is a block diagram showing a typical physical configuration a storage node of the collective storage system of the invention.

FIG. 2 illustrates a preferred embodiment of a storage node 101 in terms of its physical components. The node 101 has a fabric interface 201 for connecting to the node fabric 102, RAM 202 and NVRAM 203 for storing data while data is being processed by the node, a processor 204 for controlling and processing data, and a disk interface 205. The node 101 further includes a set of disks 207 for storing customer data which are connected to the disk interface 205 via a disk fabric 206.

The storage nodes 101 in the collective storage system 100 are non-redundant, i.e., the hardware components in the nodes such as processor 204, memories 202–203 and disks 207 are non-redundant. Thus, a failure in one or more components in a storage node 101 can bring down that entire node, and prevent access to the disks 207 on that node. This non-redundancy coupled with the higher failure rates arising out of a large population of disks 207 and nodes 101 means that the software in the system 100 must handle failures and make customer data redundant enough to allow data to be accessed in spite of failures.

In the collective storage system 100, the availability of customer data might be provided using a redundancy-based technique such as RAID data-striping, simple replication or erasure codes. In each of these techniques, customer data is stored over a set of physical storage chunks, or fragments, where each data chunk is on a different node.

The allocation of customer data over the nodes 101 and disks 103 is done by an allocation process for achieving one or more system objectives. A desired data allocation process should have two key objectives: availability and load-balancing. As for availability, when a node 101 or a disk 103 fails, all storage fragments on that node 101 or disk 103 might be lost. Therefore, there must be sufficient redundant data on other nodes to reconstruct the lost data fragments. As for load-balancing, data read/write load should be distributed over the nodes 101 to avoid bottlenecks.

Data Organization

Customer data in the system 100 is organized as fixed sized blocks that are linearly addressed within SCSI logical units (i.e., the disks). Each logical unit has a number, which is called a LUN (or a logical unit number). The system appears as a SCSI block device on a single bus with many logical units (though this is flexible for host operating systems that have limited LUN/device capabilities). Internally, a logical unit is mapped to a container. A container is a set of objects that are referred to as extents. The attributes of a container includes an identifier (container ID) that uniquely identifies a container within the storage system 100. The host LUN mapping, or the mapping function between LUN and container ID, is explicitly stored and managed by the system 100.

Figure 3:
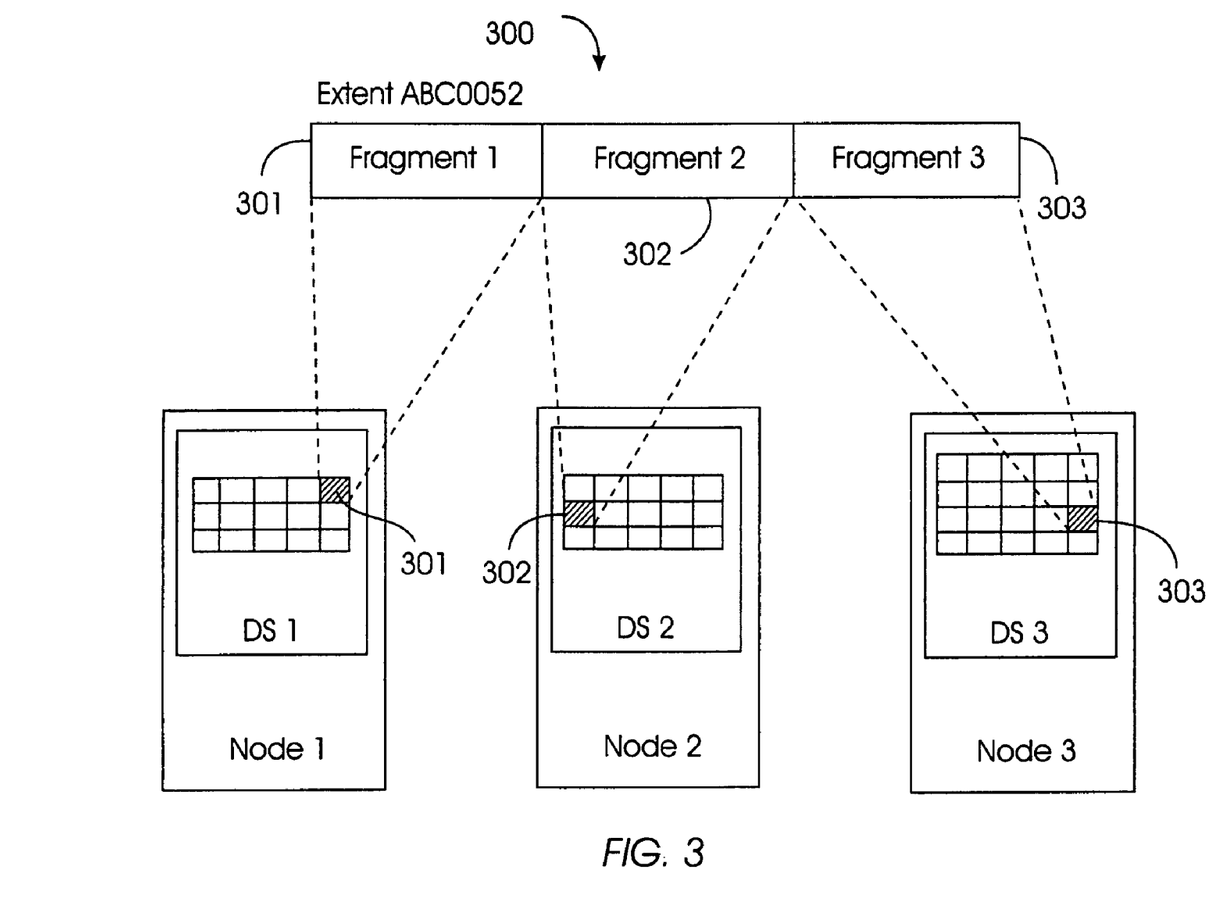
FIG. 3 illustrates an example data extent and its fragments that reside on different storage nodes.

An extent is an object that stores customer data and attributes associated with it. The extent is stored as a group of fragments where each fragment is on a different node. The fragment is uniquely identified by its extent ID and fragment ID. The group of fragments that makes up an extent is called an extent group (or a fragment relation group). FIG. 3 illustrates an extent 300 that comprises three fragments 301, 302 and 303. The fragments 301, 302 and 303 reside respectively on node 1, node 2 and node 3.

An extent's attributes include its identifier (extent ID), a redundancy level and a list of the nodes 101 that have data dependencies (replicas, erasure code, etc.) on the customer data stored in that extent. The extent ID is unique within a container. Reliability and availability of an extent 300 are achieved by distributing its fragments 301–303 onto separate nodes 101.

System Configuration

Figure 4:
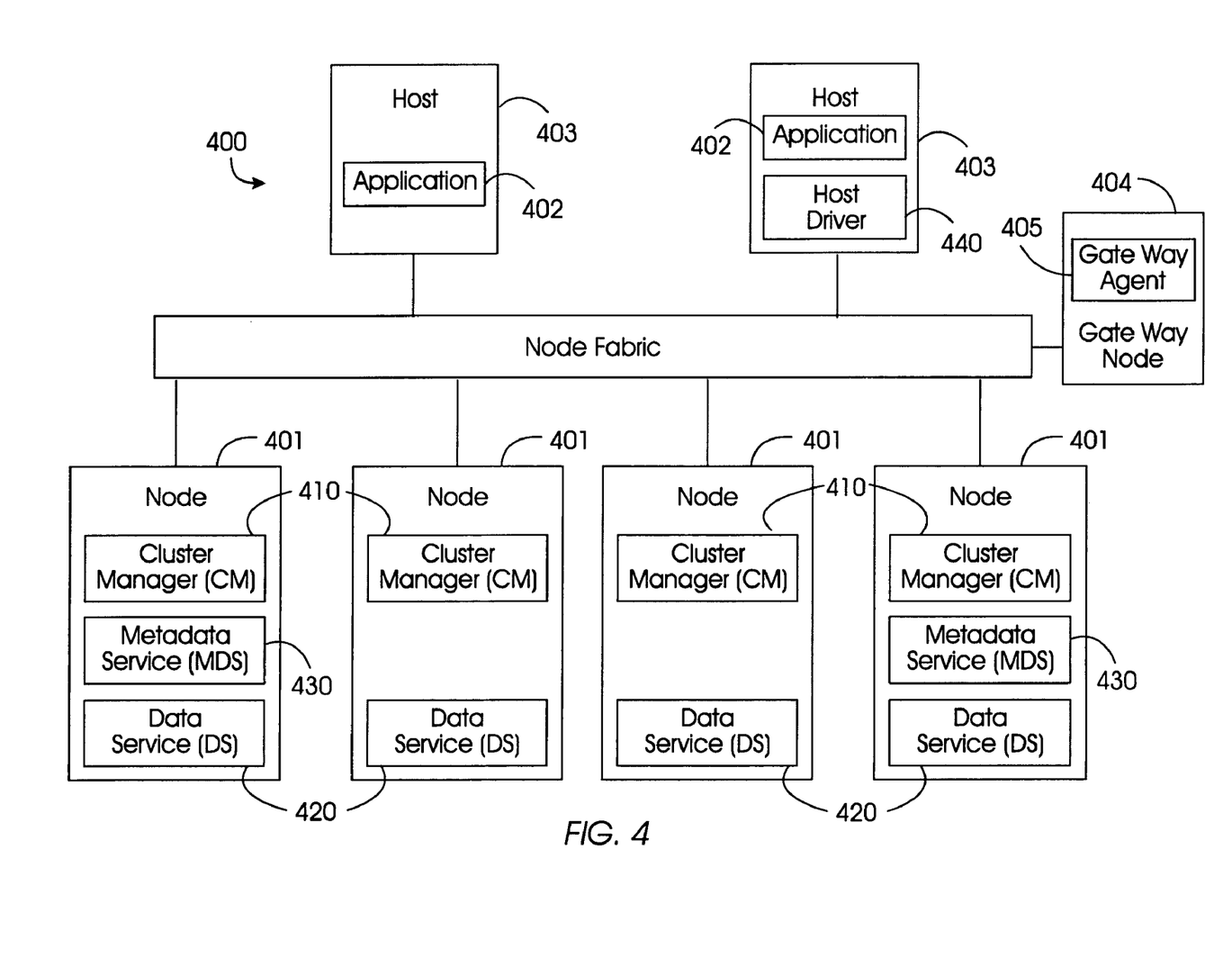
FIG. 4 is a block diagram showing a typical configuration of the collective storage system with agents to support data restoring operations in accordance with the invention.

FIG. 4 is a block diagram showing a typical configuration of the collective storage system 400 with the necessary agents to support the data restoring operations of the invention. Each node 401 of the collective storage system 400 executes concurrently one or more software agents, also referred to as modules. There are four types of agents in the collective storage system 400: Cluster Manager (CM) agents 410, Data Server (DS) agents 420, Meta Data Server (MDS) agents 430, and a Host Driver (HD) agent 440. Not all four agent types run on every storage node 401. Furthermore, in the preferred embodiments of the invention, no more than one instance of an agent type can operate on a node 401.

Cluster Manager (CM) Agent

A Cluster Manager (CM) agent 410 is responsible for maintaining an ordered list of nodes 401 that are currently running in the collective storage system 400, detecting the node failures, and detecting new nodes in the system 400. In the preferred embodiments of the invention, only one CM agent 410 runs on each node 401. Each CM agent 410 in the system 400 has a unique name, which is preferably the respective node's unique ID. The ordered lists of currently functional nodes 401 maintained by the CM agents 410 in the system 400 are identical to each other. Thus, all nodes 401 in the system 400 have the same information as to which nodes 401 are currently running in the system, i.e., an identical system view.

A Cluster Manager agent 410 detects a node failure when it does not receive an expected heart-beat within a failure detection interval from the failed node. Failure detection based on heart-beats is further described, for example, in the textbook "Building Secure and Reliable Network Applications, by K. P. Birman, Manning Publications Company, 1996.

When multiple nodes 401 attempt to join or leave the collective storage system 400 simultaneously, each CM agent 410 ensures that the notifications of the joins and leaves are delivered sequentially in the same order to all the nodes 401 in the system 400.

Data Service (DS) Agent

Figure 5:
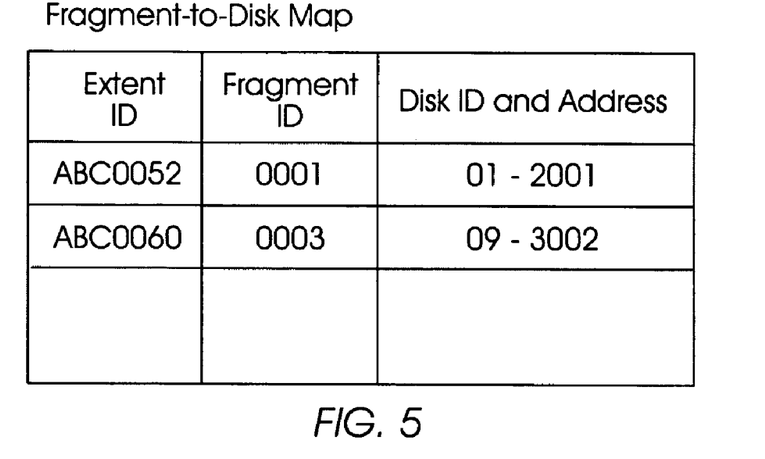
FIG. 5 illustrates an example Fragment_To_Disk map in accordance with the invention.

A Data Service (DS) agent 420 is responsible for managing raw data in a storage node 401 in the form of data fragments residing on that node. This includes data caching and data redundancy. Data caching concerns with write caching or read-ahead. To ensure data redundancy for an extent, an update to any if its data fragments is propagated to the nodes that contain the related fragments in the same extent group. In addition, the DS agent 420 maintains a persistent map called Fragment_To_Disk map. The Fragment_To_Disk map has information that correlates the data fragments in a node 101 on which the DS agent operates with logical block addresses in the disks 103 in that node. FIG. 5 shows an example Fragment_To_Disk map 400 that indicates that the fragment 0001 of extent ABC0052 resides on disk 01, at disk address 1001.

The DS agent 420 also manages a local copy of a second persistent map called Extent_To_Node map. This map includes information that correlates an extent to the operating nodes that contain the fragments making up this extent. The DS agent 420 that contains the first fragment in the extent group is called a leader for that extent. The DS agents 420 containing the remaining fragments of this extent are referred to as followers. The extent group leader is responsible for driving data repair, recovery, and updates to the followers. Leadership is transferable upon failure of a disk or node that causes the leader to be lost. The consistency control mechanism for read/writes to fragments mapping to the same extent is leader driven. That is, all I/O operations are sent to the leader of an extent group and the leader acts as a serialization point for reads/writes to that extent.

Figure 6:
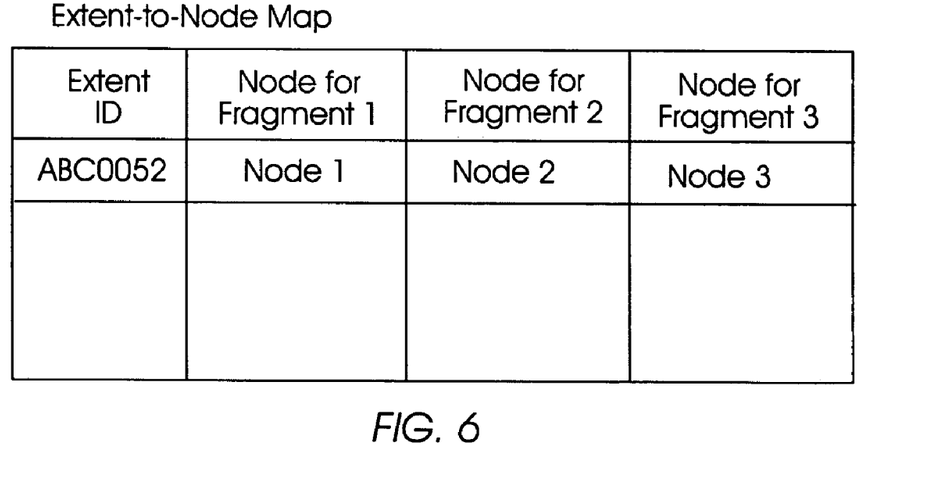
FIG. 6 illustrates an example Extent_To_Node map in accordance with the invention.

The leaders of the extent groups in the system 400 are distributed among the nodes 401 by an allocation algorithm to ensure that no single node becomes a bottleneck for being the leader. It is possible to relax the requirement that all data reads proceed through the leader. It is also possible to relax the need to have all writes submitted to the leader by having closely synchronized clocks for the nodes and using time stamps. FIG. 6 depicts an example Extent_To_Node map for the extent ABC0052.

All DS agents 420 in the storage system 400 collectively manage the extent groups in the system during reads and writes to customer data, recovery from the failure of a disk or a node, re-organization, and snapshot operations.

In the preferred embodiments of the invention, there is one instance of a DS agent running on each node in the collective storage system 400. Data extents are laid out wholly within a disk, i.e., an extent does not span across multiple disks. Consequently, as far as the extents are concerned, the failure of a disk containing a fragment of an extent is akin to the failure of the node 401 containing this same fragment.

A Data Service agent 420 detects a disk failure using regular pinging or tracking request timeouts. For example, while a disk is not being used, the DS agent 420 polls the disk at regular intervals to determine the disk status. In the case of request timeouts, the DS agent 420 might look at the disk error rates periodically to determine its status. An example for determining the disk status based on disk error rates is described by G. F. Hughes et al. in the article "Improved Disk Drive Failure Warnings", IEEE Transactions on Reliability, September 2002.

Meta Data Service (MDS) Agent

A Meta Data Service (MDS) agent 430 is responsible for managing the Extent_To_Node map, a persistent map correlating all the data extents in the system with the nodes that contain the fragments making up the extents. Note that each DS agent 420 (described above) has an Extent_To_Node map which contains entries only for those extents whose fragments it manages. On the other hand, the MDS agent 430 has the Extent_To_Node map for all of the extents in the storage system 400. The map of the MDS is indexed with the extent identifier as the primary key. A secondary index on nodes is also maintained which is useful in generating a repair plan in response to a node failure. In addition, unlike the DS agent 420, the MDS agent 430 does not run on every node 401. Instead, an adaptive technique is used to determine the set of nodes 401 that will run the MDS agents 430. The MDS agent 430 also stores and manages extent metadata and performs extent creation and deletion.

The translation of an extent in a container to its extent group is accomplished the MDS agent 430. Also, the extent allocation is provided by the MDS agent 430, which forms an extent group for a new extent. The MDS agent 430 further manages a list of configured containers and their attributes.

HostDriver(HD) Agent

A Host Driver(HD) agent 440 is an interface through which a client application 402 can access data in the collective storage system 400. The HD agent 440 communicates with the application 402 in terms of logical units (LUNs) and with the rest of the storage system 400 in terms of containers and data extents. The HD agent 440 typically resides in a host 403 where the application 402 runs. However, its interface functions might be provided in a storage node 404 in the form of a gateway agent 405. The host application then accesses data in the storage system 400 via the gateway agent 405 that resides in a gateway node 404.

To access the customer data in the system 400, the HD agent 440 or the gateway agent 405 determines the extent and the leader for that extent. The HD agent 440 or the gateway agent 405 then access data from the storage node that contains the leader of the extent. To access a data extent, a client needs to first obtain the location of the extent. This function is provided by the MDS agent 430. Given an extent identifier, the MDS agent 430 returns a list of nodes where the fragments of that extent can be found.

Data Restoring

The process for restoring data in the collective storage system 400 after a node failure or a disk failure is now described. Restoring is the act of recreating lost data, due to the failed disk or node, at new nodes or disks to insure against data loss from subsequent failures. A desired restore process should have the following properties:

a) Correct: All affected customer data is eventually rebuilt.

b) Fault-tolerant: If a second failure occurs while a data restoring is in progress, then Property (a) is maintained.

c) Efficient: The restore process requires as few message exchanges and data movements between nodes as possible.

d) Balanced: The data restore work is distributed across the nodes to minimize the effect on concurrent access to customer data.

e) Scalable: The time taken to restore from a failed disk or node should inversely scale with the size of the system, i.e., the larger the system, the shorter the restore time. This is important since the system has to deal with higher failure rates as the system grows.

Figure 7:
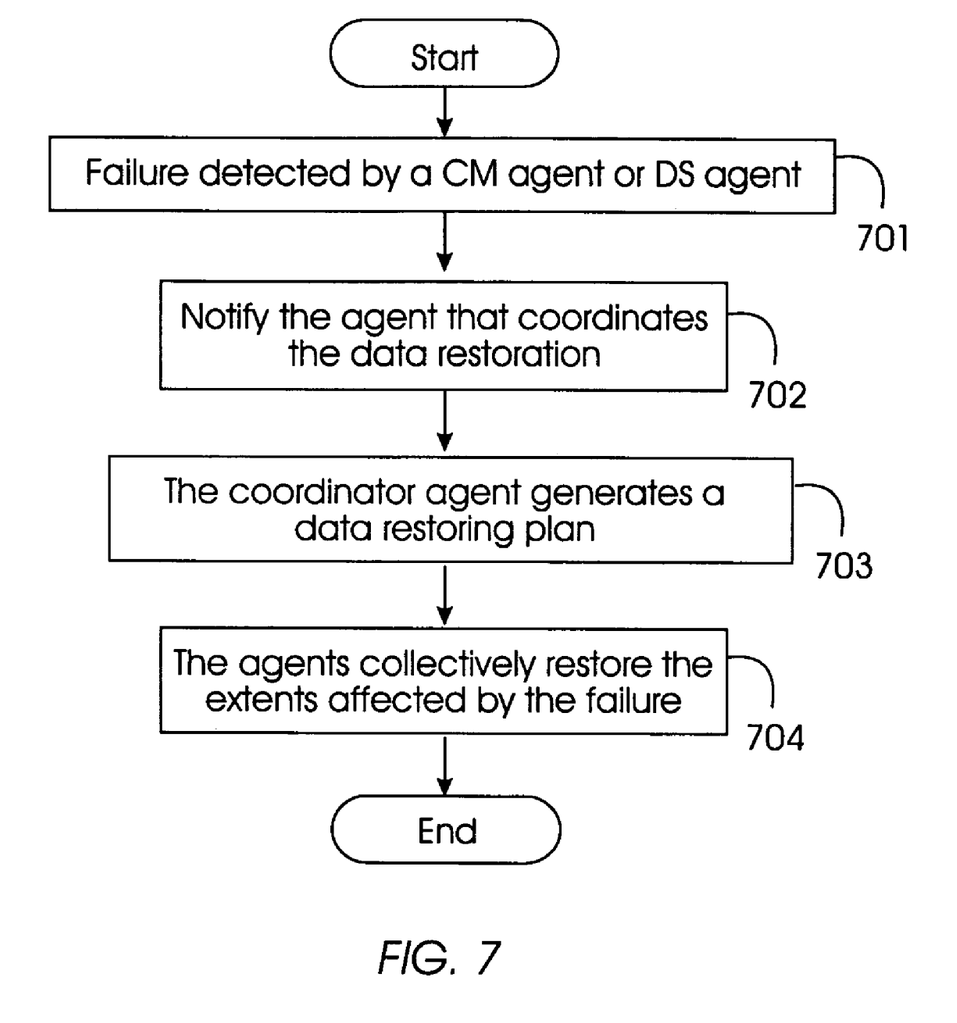
FIG. 7 is a flow chart showing a general process for restoring data following a node failure or a disk failure in the collective storage system of the invention.

FIG. 7 is a flow chart showing a general process for restoring lost data following a node failure or a disk failure in the collective storage system 400. At step 701, a failure is detected by an agent in the system 400. As described above for the CM and DS agents, a node failure is detected by a CM agent while a disk failure is detected by a DS agent. At step 702, the agents in the system 400 that responsible for coordinating the data restoring are notified of the failure. In one preferred embodiment of the invention, the restoring is coordinated by one of the MDS agents in the system. In another embodiment of the invention, the restoring is coordinated by one of the DS agents in the system. At step 703, a data restoring plan is generated by the coordinator agent, as described below in reference to FIGS. 8–9. The plan identifies the data extents in the system that are affected by the failure. At step 704, the agents in the system collectively restore the affected extents based on the restoring plan.

Figure 8:
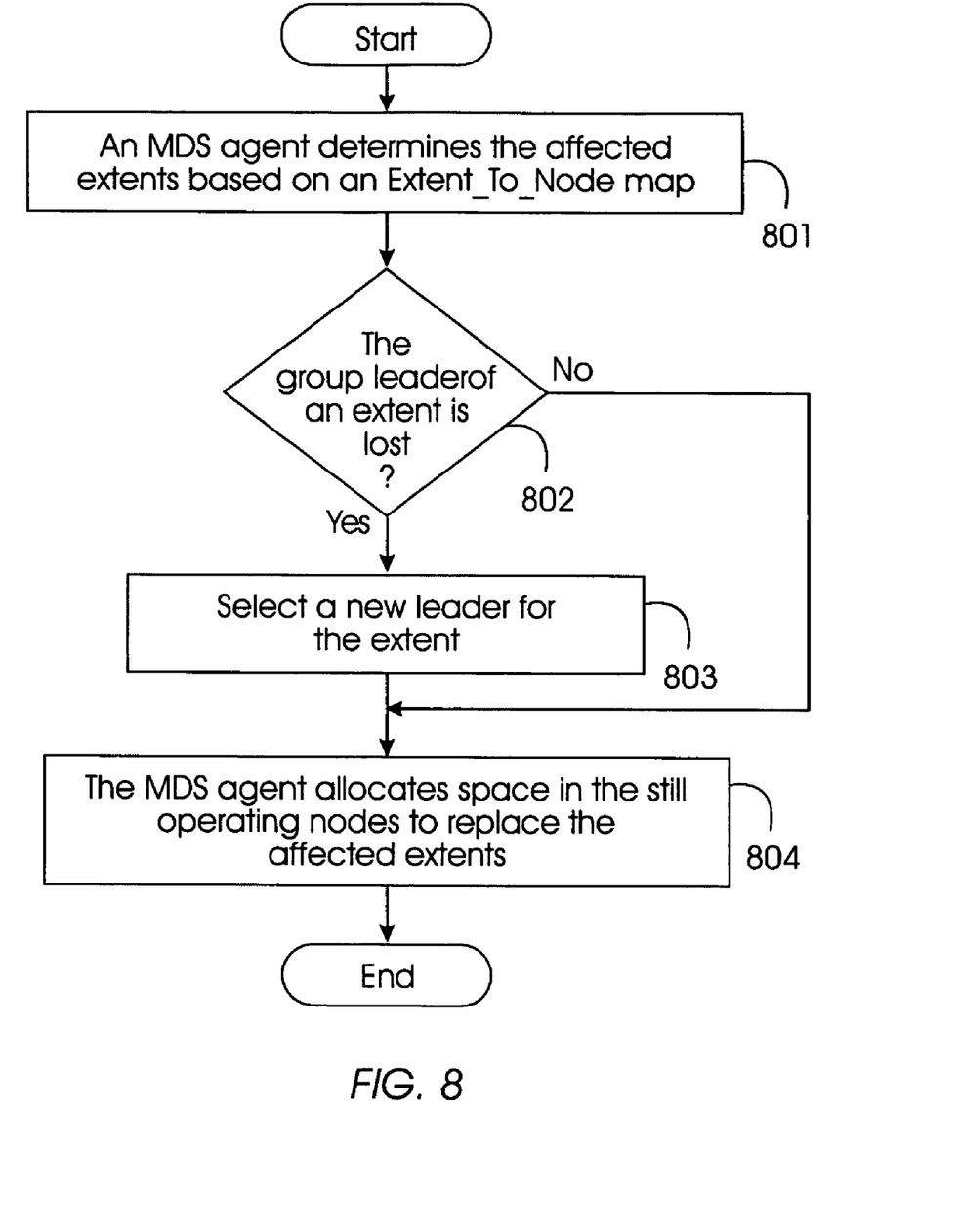
FIG. 8 is a flow chart showing a preferred process for generating a data restoring plan after a node failure in accordance with the invention.

FIG. 8 is a flow chart showing a preferred process for generating a data restoring plan after a node failure in accordance with the invention. At step 801, an MDS agent determines the data extents affected by the node failure using the Extent_To_Node map. The entries in this map correlate the extents in the storage system with the nodes of the system. By scanning this map based on the identity of the failed node, the affected extents are identified. At step 802, the method determines whether any extent leaders are lost. If a leader is lost due the failure, then a new leader for that extent is chosen from the remaining fragments in the extent group at step 803. A simple selection here is to make the DS agent holding the first of the remaining fragments in the extent as the new leader if it had not been the previous leader. The MDS agent then allocates new space in the still functioning nodes to accommodate the data of the affected extents, at step 804.

Figure 9:
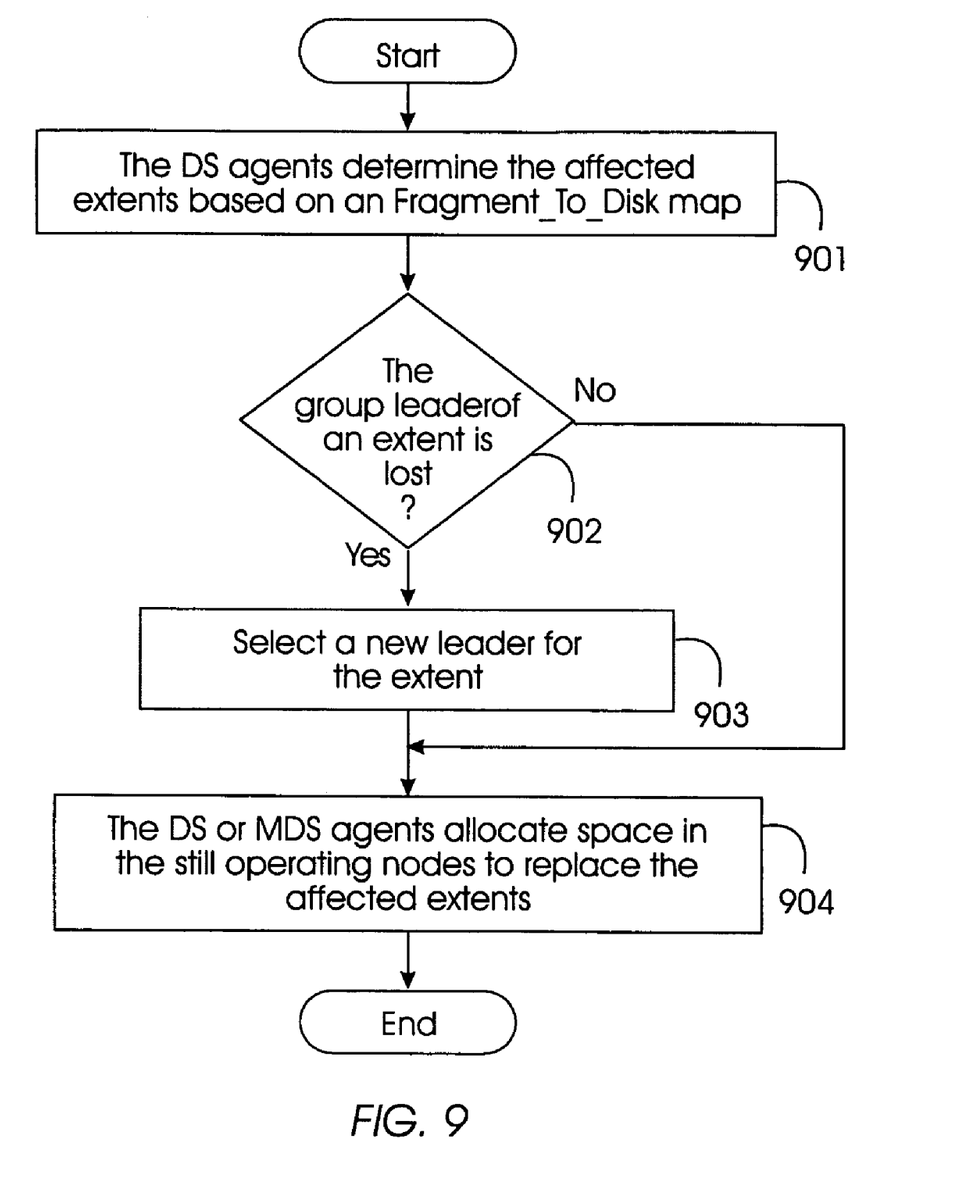
FIG. 9 is a flowchart showing a preferred process for generating a data restoring plan after a disk failure in accordance with the invention.

FIG. 9 is a flow chart showing a preferred process for generating a data restoring plan after a disk failure in accordance with the invention. At step 901, the DS agent associated with the failed disk determines the data extents affected by the disk failure based on the Fragment_To_Disk maps in the DS agent. This map indicates the fragment IDs for the fragments on each disk. Using the failed disk ID, the fragments on the failed disk might be determined by scanning the map. At step 902, the method determines whether any extent leaders are lost. If a leader is lost due the failure, then a new leader for that extent is chosen from the remaining fragments in the extent group at step 903. A simple selection here is to make the DS agent holding the first of the remaining fragments in the extent as the new leader if it had not been the previous leader. At step 904, new space is allocated in the still functioning nodes to accommodate the data of the affected extents. In one preferred embodiment of the invention, the DS agents drive the restoring task and thus allocate the new space. In another preferred embodiment of the invention, an MDS agent is responsible for coordinating the restore work and handles the allocation task.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A collective data storage system comprising:

a plurality of storage nodes connected by a network, each node storing data as extents;

a data service (DS) agent in each node for managing the extents in the node;

a plurality of metadata service (MDS) agents for managing metadata relating to the nodes and the extents, the MDS agents operating in a subset of the nodes;

a cluster manager (CM) agent in each node for detecting a failure in the system and notifying a subset of the DS or MDS agents of the failure, wherein upon notification of the failure, the subset of DS or MDS agents independently generates a plan to restore the extents affected by the failure and collectively restoring the affected extents based on the plan; and a persistent map that correlates the data extents with the nodes; and wherein each MDS agent manages a subset of the map.

2. The storage system as recited in claim 1 further comprising an interface to allow a host application to access data stored in the system.

3. The storage system as in recited in claim 1 further comprising means for determining a subset of the nodes in which the MDS agents operate.

4. The storage system as recited in claim 1, wherein each CM agent maintains an ordered list of the nodes that are currently operating in the system.

5. The storage system as recited in claim 1, wherein each CM agent includes means for detecting a node failure.

6. The storage system as recited in claim 5, wherein said means for detecting a node failure includes means for detecting a missing heart-beat within a predetermined time interval.

7. The storage system as recited in claim 1, wherein each CM agent includes means for detecting a new node in the system.

8. The storage system as recited in claim 7, wherein said means for detecting a new node includes means for monitoring network messages from the new node.

9. The storage system as recited in claim 1, wherein each DS agent propagates updates to the extents in the associated node to other DS agents in the system.

10. The storage system as recited in claim 1, wherein each DS agent manages data caching in the associated node.

11. The storage system as recited in claim 1, wherein: each node comprises a plurality of data disks; and each DS agent includes means for detecting a failure of the disks in the associated node.

12. The storage system as recited in claim 11, wherein said means for detecting the disk failure is based on error rates of the disks.

13. The storage system as recited in claim 1, wherein the restore plan includes a list of the extents to be restored to re-establish data redundancy in the system.

14. The storage system as recited in claim 13, wherein the extents to be restored are collectively restored by the DS agents.

15. The storage system as recited in claim 13, wherein space is allocated in the nodes that are still operational to replace the extents affected by the failure.

16. The storage system as recited in claim 15, wherein data in the affected extents is determined and transferred to the allocated space.

17. The storage system as recited in claim 1, wherein: one of the MDS agents is notified of the failure; and the notified MDS agent determines those extents affected by the failure based on an Extent_To_Node map.

18. The storage system as recited in claim 1, wherein: the DS agents are notified of the failure; and the notified DS agents determine those extents that have data on a failed node based on an Extent To Node map.

19. A method for restoring data in a collective storage system having a plurality of storage nodes interconnected by a network and storing data as extents, Data Service (DS) agents for managing the extents, Metadata Service (MDS) agents for managing metadata relating to the nodes and the extents, and Cluster Manager (CM) agents, the DS agents managing the extents in each node, the method comprising the steps of:
detecting a failure in the system by one of the CM agents;
notifying a subset of the DS or MDS agents of the failure;
generating, by the notified DS or MDS agents independently, a plan to restore the data extents affected by the failure; and
collectively restoring the affected extents based on the generated plan; wherein each node includes a plurality or disk drives; the detected failure is a disk failure; and the disk failure is detected by a DS agent based on error rates of the disks.

20. The method as recited in claim 19, wherein the detected failure is a node failure.

21. The method as recited in claim 20, wherein the node failure is detected based on a missing heart-beat within a predetermined time interval.

22. The method as recited in claim 19, wherein the step of generating the restore plan includes the steps of; determining the extents affected by the failure; and allocating space in the nodes that are still operational to replace the affected extents.

23. The method as recited in claim 22, wherein the step of restoring includes the steps of: determining data in the affected extents; and transferring the determined data to the allocated space.

24. The method as recited in claim 19, wherein: each extent comprises a group of data fragments each residing on a different node, the DS agent associated with one of the fragments being a leader of the group; if the node on which the leader resides fails, then a new leader is chosen for the group as part of the data restoring; and the leader is notified of the fragments affected by the failure.

25. The method as recited in claim 19, wherein each DS agent includes means for managing data caching and means for propagating updates on the data extents to other nodes.

26. The method as recited in claim 19, wherein each DS agent includes means for propagating updates on the data extents of the DS agent to other nodes.

27. The method as recited in claim 19 further comprising the step of determining a subset of the nodes in which the MDS agents operate.

28. The method as recited in claim 19 further comprising the step of maintaining, by each CM agent, an ordered list of the nodes that are currently operating in the system.

29. The method as recited in claim 19 further comprising the step of detecting a node failure by a CM agent.

30. The method as recited in claim 29, wherein the step of detecting a node failure includes the step of detecting a missing heart-beat within a predetermined time interval.

31. The method as recited in claim 19 further comprising the step of detecting a new node in the system.

32. The method as recited in claim 31, wherein the step of detecting a new node includes the step of monitoring network messages from the new node.

33. The method as recited in claim 19 further comprising the step of propagating updates on the extents, by the DS agent in one of the nodes, to the DS agents in other nodes.

34. The method as recited in claim 19, wherein the agents notified of the failure are the MDS agents.

35. The method as recited in claim 19, wherein the agents notified of the failure are the DS agents.

36. A computer-program product for restoring data in a collective storage system having a plurality of storage nodes interconnected by a network and storing data as extents, Data Service (DS) agents for managing the extents, Metadata Service (MDS) agents for managing metadata relating to the nodes and the extents, and Cluster Manager (CM) agents, the DS agents managing the extents in each node, the computer-program product comprising a computer readable medium comprising program code for:
detecting a failure in the system by one of the CM agents;
notifying a subset of the DS or MDS agents of the failure;
generating, by the notified DS or MDS agents independently, a plan to restore the extents affected by the failure;
collectively restoring the affected extents based on the generated plan;
wherein the generating the restore plan includes the steps of:
determining the extents affected by the failure;
allocating space in the nodes that are still operational to replace the affected extents; and
wherein the restoring includes the steps of:
determining data in the affected extents; and
transferring the determined data to the allocated space.

* * * * *